United States Patent [19]

Crowell

[11] Patent Number: 5,485,793
[45] Date of Patent: Jan. 23, 1996

[54] VEHICLE DESK

[76] Inventor: Anthony D. Crowell, 959 Triunfo Canyon, West Lake Village, Calif. 91361

[21] Appl. No.: 175,288

[22] Filed: Dec. 29, 1993

Related U.S. Application Data

[63] Continuation-in-part of Ser. No. 14,731, Feb. 8, 1993, abandoned.

[51] Int. Cl.⁶ ................................................. A47B 23/00
[52] U.S. Cl. ............................................................ 108/44
[58] Field of Search ............................... 108/44, 45, 42, 108/150; 248/349, 346

[56] References Cited

U.S. PATENT DOCUMENTS

| | | | |
|---|---|---|---|
| 2,331,488 | 10/1943 | Madsen | 108/150 |
| 3,381,635 | 5/1968 | Pforr | 108/150 |
| 3,391,960 | 2/1968 | Megargle et al. | 108/44 X |
| 4,086,859 | 5/1978 | Dondero | 108/44 X |
| 4,359,004 | 11/1982 | Chappell | 108/44 |
| 4,842,174 | 6/1989 | Sheppard et al. | 108/45 X |
| 4,863,124 | 9/1989 | Ball | 108/42 X |
| 5,121,891 | 6/1992 | Goldsmith | 100/150 X |
| 5,144,852 | 9/1992 | Yokoyama | 248/346 X |

Primary Examiner—Jose V. Chen
Attorney, Agent, or Firm—Timothy T. Tyson; Joseph Compton; Freilich, Hornbaker & Rosen

[57] ABSTRACT

Vehicle desks (20, 220) are disclosed which are spaced from a front vehicle seat (32) to present the work surface (24) of a rotatable shelf (52) to the driver or the front seat passenger. A rotatable arm (58) facilitates placement of the shelf in a convenient position. When not needed, the major portion of the desk is easily removed from the vehicle.

3 Claims, 7 Drawing Sheets

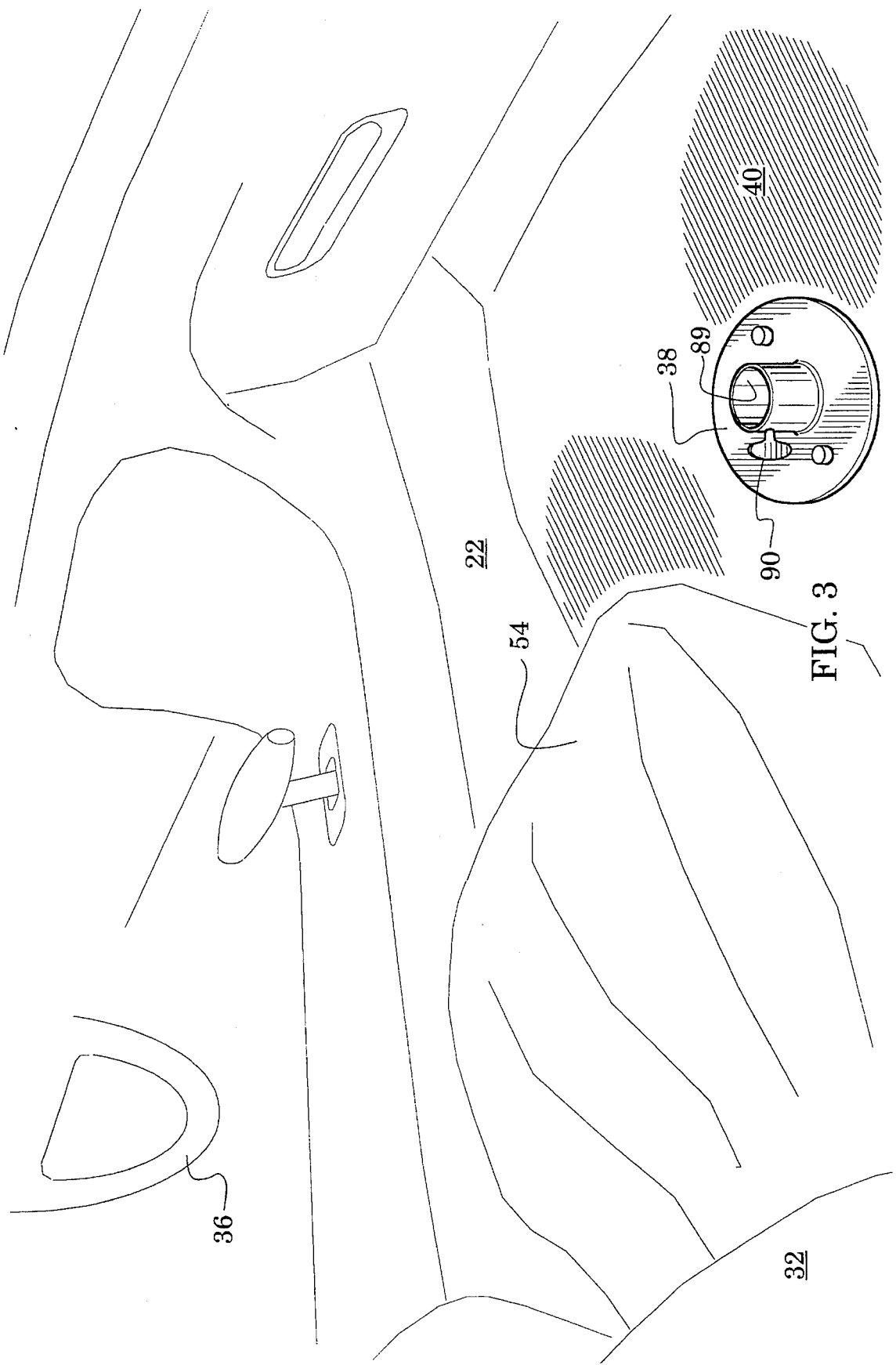

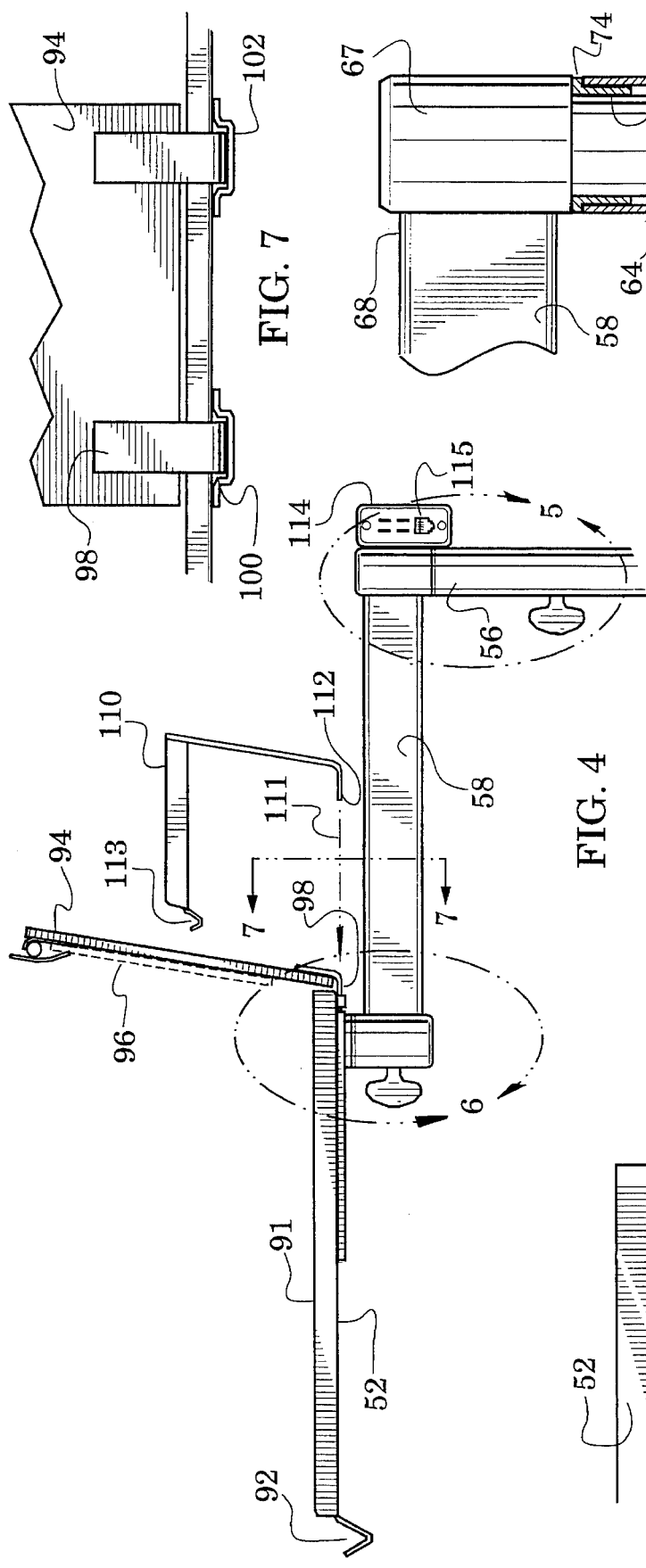
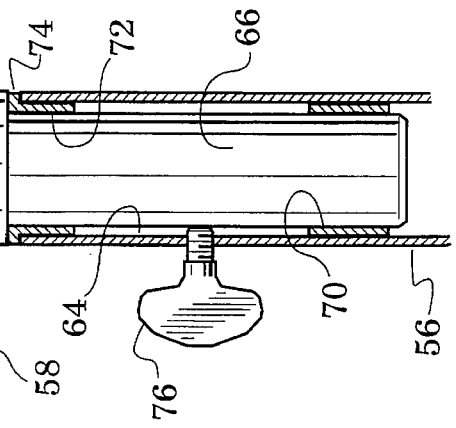
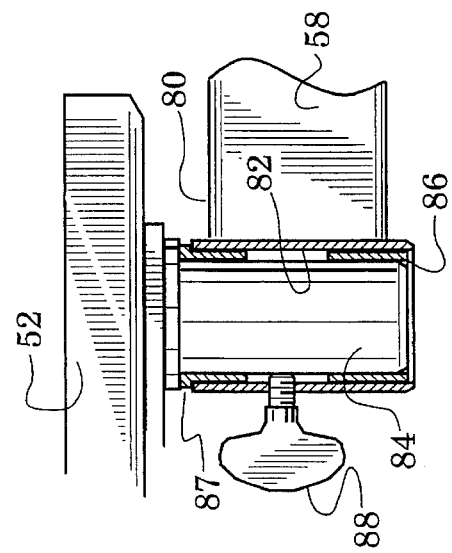

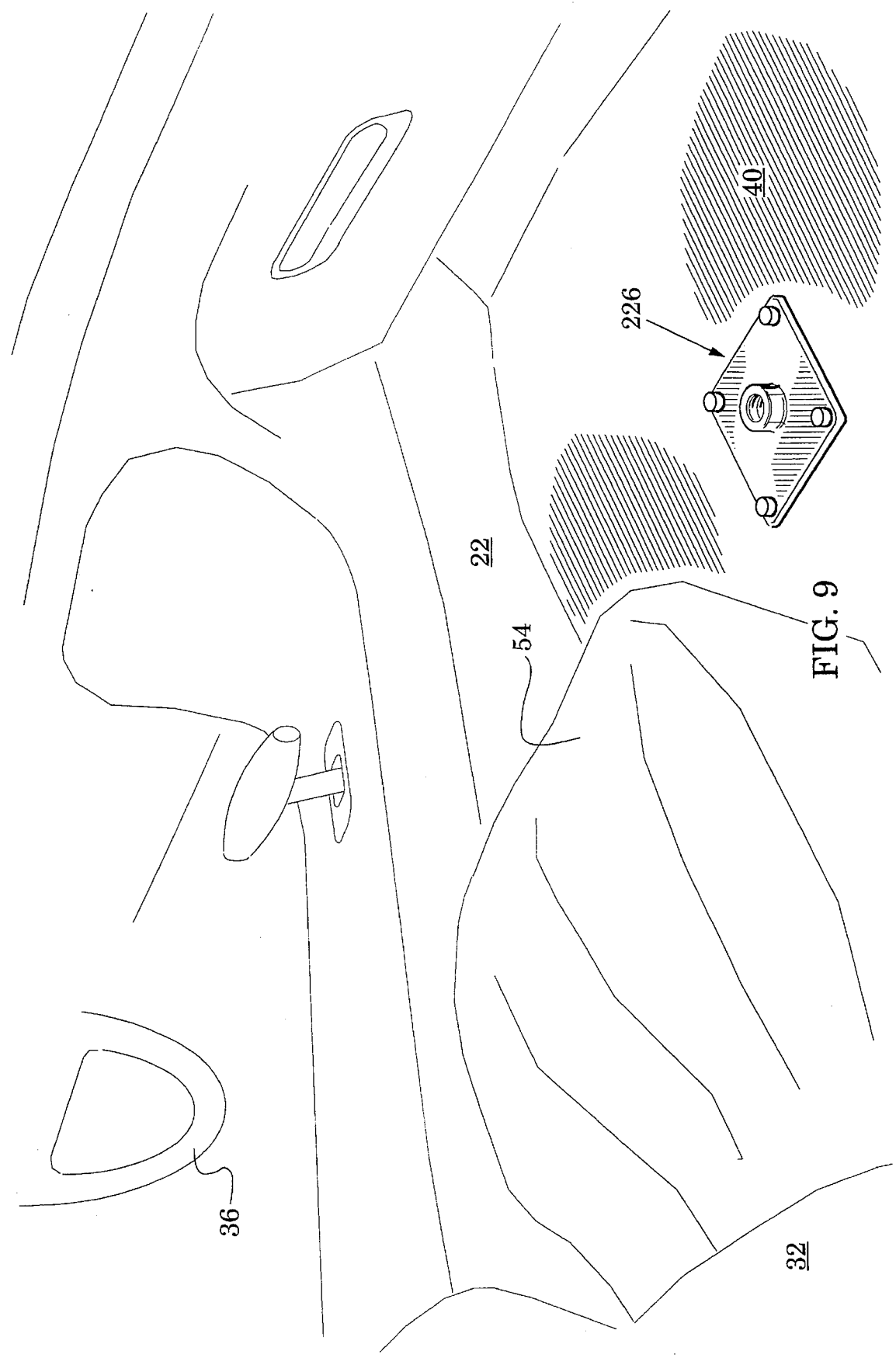

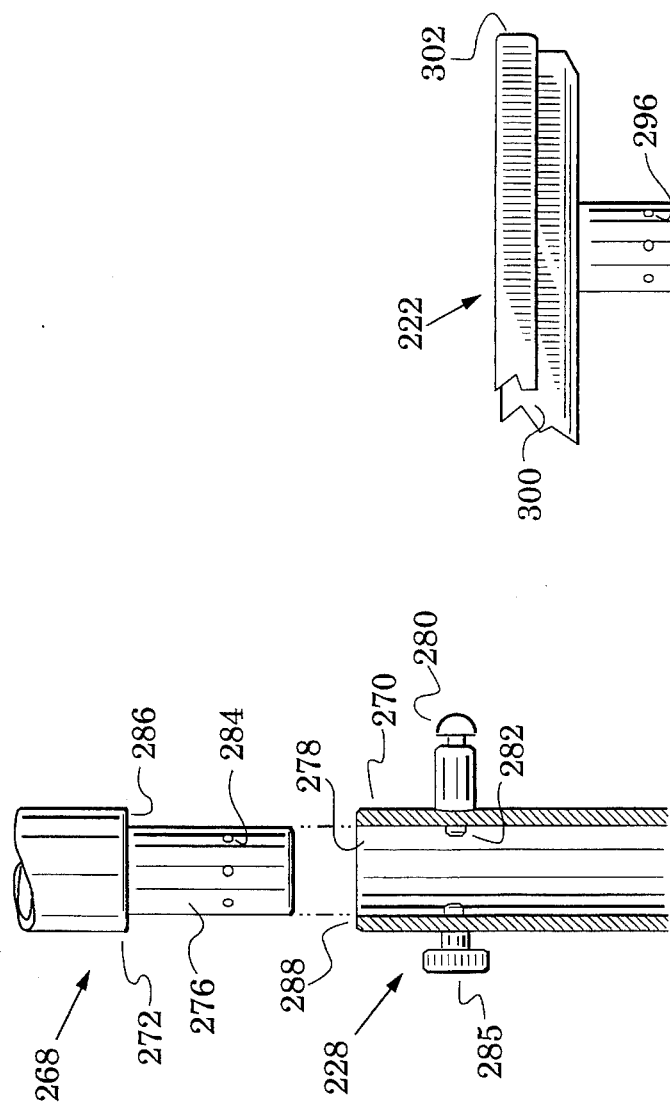
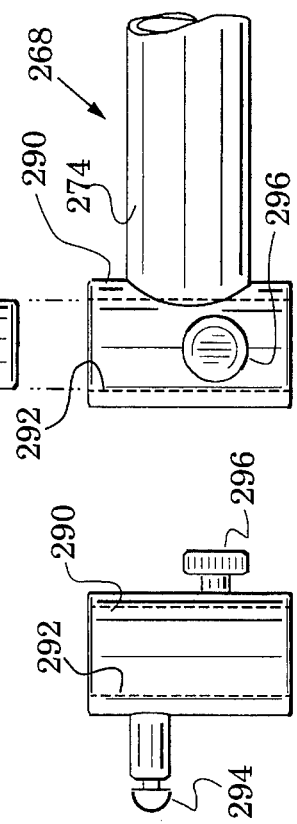
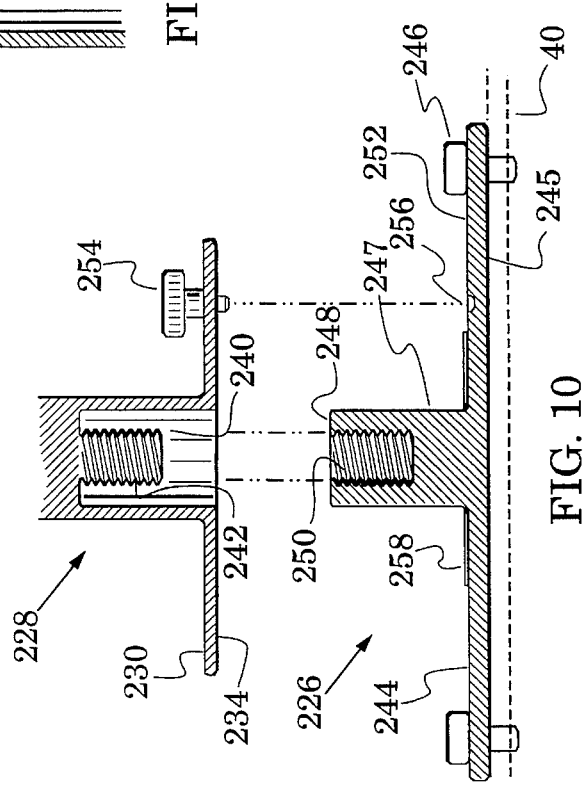

VEHICLE DESK

CROSS REFERENCES TO RELATED APPLICATIONS

This is a continuation-in-part of application Ser. No. 08/014,731 filed Feb. 8, 1993, now abandoned the disclosure of which is hereby incorporated by reference.

FIELD OF THE INVENTION

The present invention relates generally to desks for vehicles and more particularly to desks spaced from the vehicle seats.

BACKGROUND OF THE INVENTION

Desks for vehicles have typically been configured to be supported in some manner by the vehicle seats (e.g., U.S. Pat. Nos. 1,398,496; 2,934,391; 3,031,242; 3,345,118; 3,922,973; 4,792,183; 4,909,159; and 4,942,827). Such desks thus usually remove seating space from the vehicle and, in addition, they generally do not provide means for moving a work surface of the desk to a position where it is conveniently accessible to the driver.

Other vehicle desks have been configured to be free of the vehicle seats but place a desk surface in locations at or below the vehicle seat level which precludes use as a work surface. Desks of this type are also often incompatible with floor mounted transmission controls (e.g., U.S. Pat. No. 3,880,091).

Apparatus having provisions for user positioning of a working surface are generally not compatible with vehicular space and mounting requirements nor configured to operate in an environment of acceleration and deceleration (e.g., computer monitor arm 921-6150 supplied by the Quill Corporation of Ontario, Calif.).

SUMMARY OF THE INVENTION

The present invention is directed to a vehicle desk.

Apparatus in accordance with the invention are characterized by a base mountable on a vehicle interior floor, a shelf and a support disposed between the base and the shelf. The base is preferably spaced from a vehicle front seat and the support defines sufficient vertical extension to position the shelf in a vertically spaced relationship with the lower portion of the vehicle front seats. The shelf is preferably configured to carry desk equipment such as a portable computer.

In a preferred embodiment, the support has a downward extending portion removably received by the base and an outward extending portion rotatably coupled to the downward extending portion. The shelf is rotatably carried by the outer end of the outward extending portion.

In accordance with a feature of the invention, structure is provided to forcibly pull the support and the base together to support the upward extending support member against lateral forces.

In a preferred embodiment, the support and base together define a rim which is received within a groove to provide lateral support to the upward extending support member. In this preferred embodiment, the support and base together define a collar and a surface which abut to provide lateral support to the upward extending support member.

The novel features of the invention are set forth with particularity in the appended claims. The invention will be best understood from the following description when read in conjunction with the accompanying drawings.

BRIEF DESCRIPTION OF DRAWINGS

FIG. 3 illustrates a base which remains attached to the vehicle interior after removal of the major portion of the desk of FIG. 1;

FIG. 4 is an elevation view of a portion of the embodiment of FIG. 1;

FIG. 5 is an enlarged view of the structure within the curved line 5 of FIG. 4;

FIG. 6 is an enlarged view of the structure within the curved line 6 of FIG. 4;

FIG. 7 is an enlarged view along the plane 7—7 of FIG. 4;

FIG. 9 illustrates a base which remains attached to the vehicle interior after removal of the major portion of the desk of FIG. 8;

FIG. 10 illustrates engagement between the base and an upward extending support member of the desk of FIG. 9;

FIG. 11 illustrates engagement between the upward extending support member and an outward extending support member of the desk of FIG. 9;

FIG. 12A illustrates engagement between the outward extending support member and a work surface of the desk of FIG. 9; and FIG. 12B is a side view of the outward extending support member of FIG. 12A.

DESCRIPTION OF PREFERRED EMBODIMENTS

Figure 1:
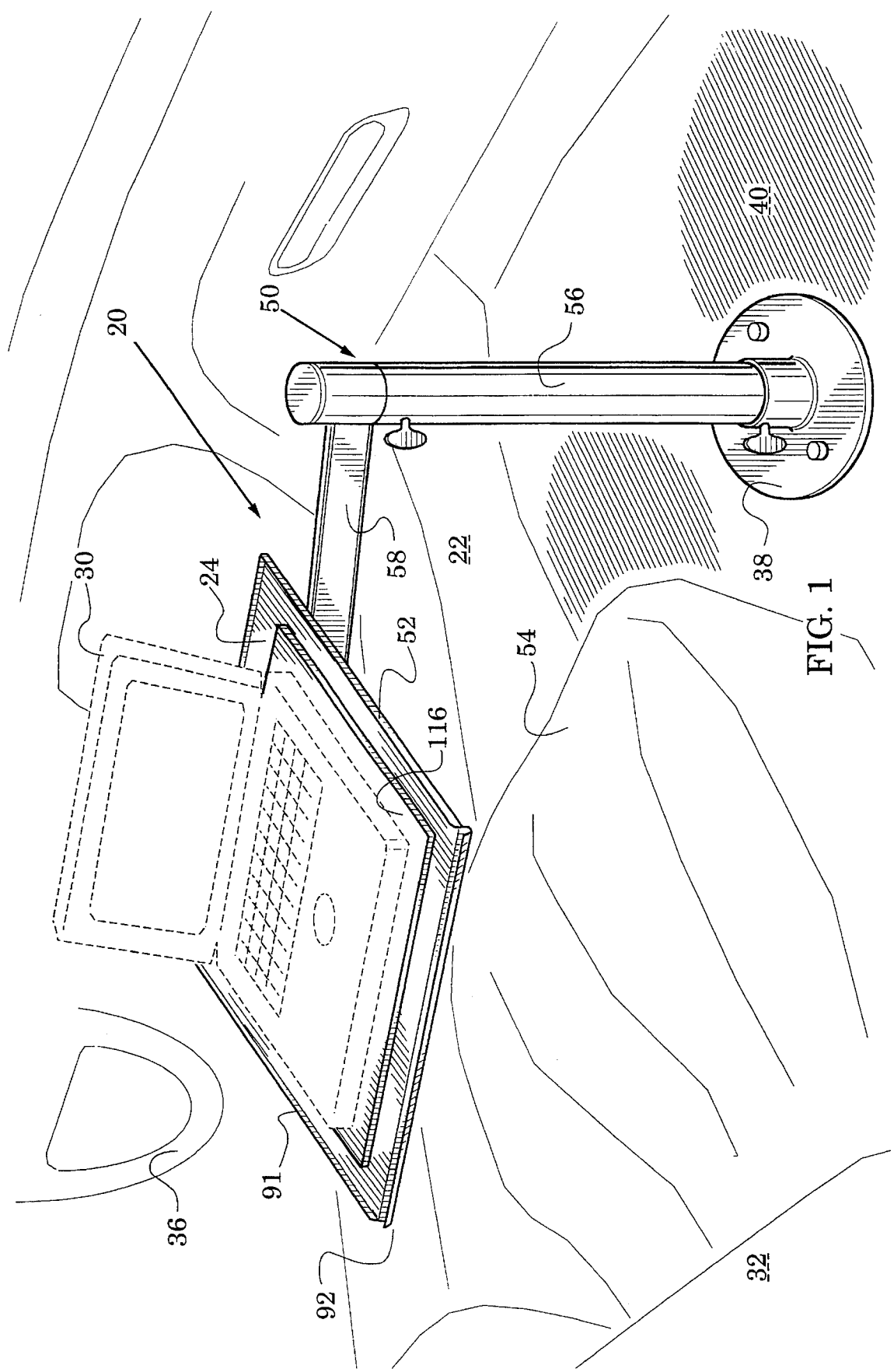
FIG. 1 is a perspective view of a preferred desk embodiment, in accordance with the invention, installed in a vehicle interior.

FIG. 1 illustrates a preferred vehicle desk embodiment 20, in accordance with the present invention, installed in a vehicle interior 22. The desk 20 presents a work surface 24 conveniently spaced above the level of the lower portion of the front vehicle seats while the desk is generally spaced from the front passenger seat. Typical desk equipment such as the portable computer 30 can thus be mounted on the surface 24 to be accessible for operation by the driver.

FIG. 1 illustrates the desk 20 oriented for use by an occupant of the front passenger seat but, as will be described herein, it is configured to be easily swung to another orientation which presents the computer 30 to the driver seated behind the steering wheel 36. Other desk equipment that might be carried by the desk 20 includes calculators, cellular telephones, briefcases and general stationery.

Figure 2:
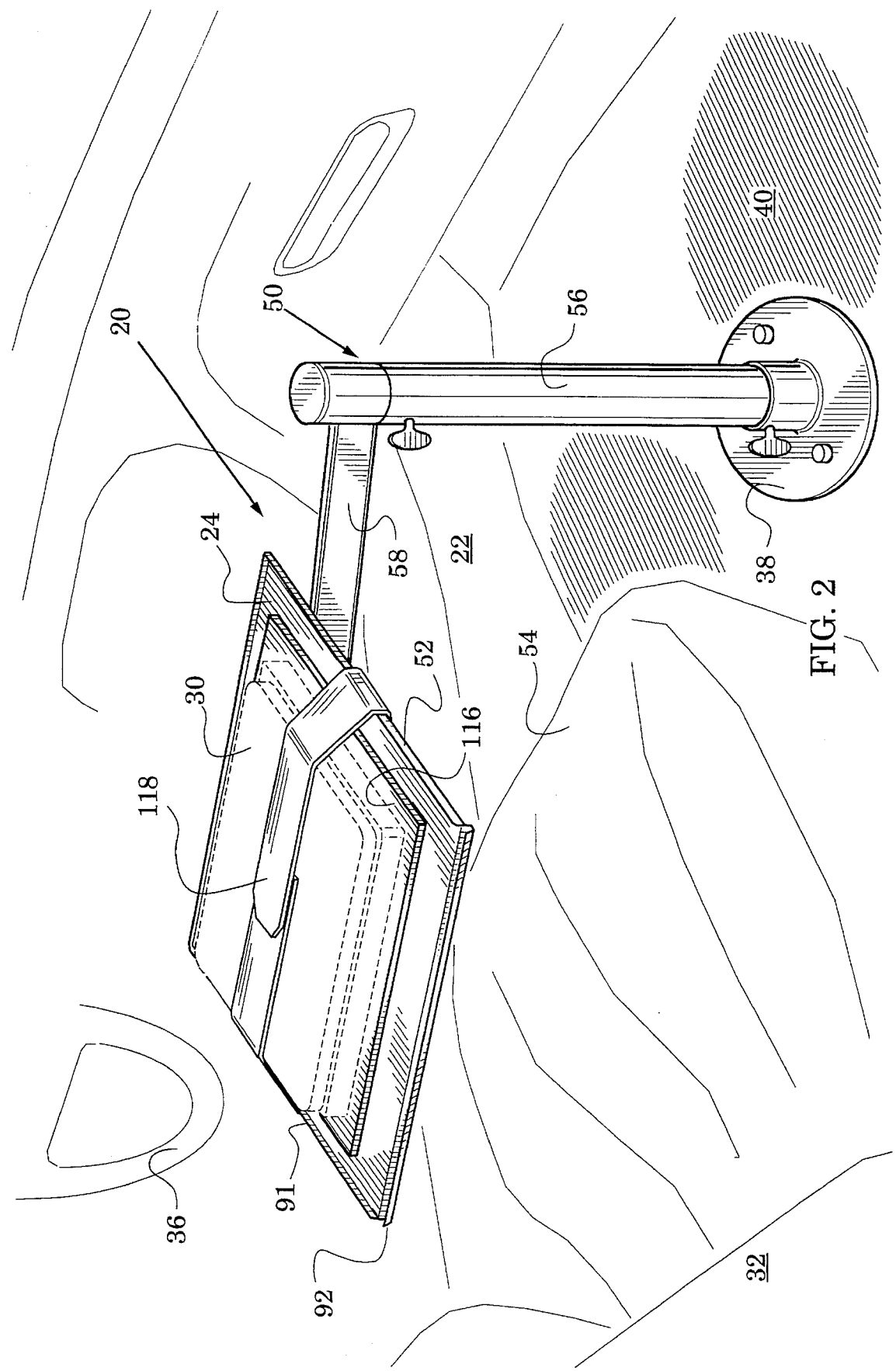
FIG. 2 illustrates a portable computer secured to the embodiment of FIG. 1.

As shown in FIG. 2 which is a view similar to FIG. 1, the desk 20 facilitates securing of the computer 30 in a secure position during operation of the vehicle. In this mode of use, not only is equipment secured to the surface 24 but movable portions of the desk 20 are also locked in position to resist acceleration and deceleration of the vehicle.

Finally, as shown in FIG. 3, major portions of the desk 20 are easily removable from the vehicle leaving only a base 38 secured to the front floor pan 40. Therefore, when the desk is not required, the vehicle is quickly restored to its original configuration and use of the front seat is unimpaired.

Thus a desk 20 is provided that does not block the use of a vehicle seat. The desk can be oriented for use by either the driver or a front seat passenger and then quickly secured for vehicle operation. When desired, the major portion of the desk is easily removed from the vehicle. The embodiment 20 is particularly useful in situations where vehicular visits are made to various dispersed locations where computing or other desk related functions, e.g., phone calls and memo writing, need to be performed.

Attention is now redirected to details of FIG. 1. The embodiment 20 has a base 38 which is mounted to the floor pan 40 preferably spaced from the front passenger seat 32. A support 50 is removably attached to the base 38 and defines sufficient vertical extension therefrom to position a shelf 52, and its work surface 24, above the level of the lower portion of the front seats, e.g., the passenger seat lower portion 54. The support 50 has a downward extending elongate support member 56 received by the base 38 and an outward extending arm support portion 58 rotatably mounted to the member 56. In addition, the shelf 52 is rotatably mounted to the outer end of the arm 58. Thus, the outer end of the arm 58 can be swung in an arc and the shelf 52 can be rotated thereon, allowing the work surface 24 to be presented to the driver.

The embodiment 20 may be described in greater detail with reference to FIGS. 4–7. FIG. 4 is an elevation view of a portion of the desk 20 illustrating that the shelf 52 is rotatably mounted to the arm 58 which is, in turn, rotatably mounted to the member 56.

FIG. 5, which is an enlarged view of the structure within the curved line 5 of FIG. 4, shows that the member 56 defines a socket 64 into which is rotatably received a pin 66 descending from an enlarged head 67 defined by the inner end 68 of the arm 58. Bushings in the form of a sleeve 70 and a sleeve 72 having a lip 74 are disposed between the pin 66 and head 67 and the socket 64 to enhance rotation and stability between the arm 58 and member 56. These bushings may be formed of various polymers, e.g., teflon and polypropylene. The sleeve 70 is dimensioned to be a press fit within the member 56. A set screw 76 is threaded through the member 56. When it is desired to lock the arm 58 and member 56 against rotation therebetween, the screw 76 is turned to abut the pin 66.

FIG. 6, which is an enlarged view of the structure within the curved line 6 of FIG. 4, illustrates that the outer end 80 of the arm 58 also defines a socket 82 which rotatably receives a pin 84 descending from the shelf 52. Sleeves 86 and 87 are fabricated respectively similar to sleeves 70 and 72 are disposed in a similar manner between the pin 84 and the socket 82 to enhance rotation and stability between the arm 58 and shelf 52. A set screw 88 is disposed to lock the shelf 52 to the arm 58 to prevent rotation therebetween in a manner similar to that of the set screw 76.

As seen in FIG. 3, the base 38 also defines a socket 89 to receive the member 56 and a set screw 90 is disposed in the base to abut the member 56 when it is inserted into the base as shown in FIGS. 1, 2. When the major portion of the desk 20 is removed as in FIG. 3, a plastic cover (not shown) may be snapped over the base 38.

Objects placed on the shelf work surface 24 are restrained thereon by an upturned lip 91 which is best seen in FIGS. 1 and 4. Additionally, the shelf 52 defines a depression 92 for holding objects such as pencils and pens. A clipboard 94, which may be used to hold materials such as a note pad 96, is mounted to the shelf 52. FIG. 7, which is a view along the plane 7—7 of FIG. 4, shows that the clipboard defines tongues 98 which are received in slots 100 of the shelf 52. The slots may be defined with tabs 102 attached to the shelf 52.

A tray 110 may be substituted for the note pad 94 as indicated by the arrow 111. The tray 110 defines tongues 112 (similar to the note pad tongues 98) which are received in the slots 100. The tray 110 also defines a depression 113 for retaining small objects such as pencils. The tray 110 is held in a vertically spaced relationship with the shelf 52.

When electrical power is required for equipment on the desk 20, it may be obtained from an AC/DC electrical converter 114 mounted at the upper end of the member 56 as seen in FIG. 4 (for clarity of illustration, the converter is not shown in other views). The wires connecting the converter to the vehicle battery may be routed downward through the member 56 and the base 38 and passed beneath the floor pan 40. Alternatively, the wires could be passed along the floor pan and beneath the dashboard.

Also mounted in the face plate of the AC/DC converter 114 is a cellular phone jack 115. The jack 115 facilitates placement of a modem on the shelf 52 through which a computer (e.g., computer 30 of FIGS. 1, 2) may communicate over a cellular phone link.

FIGS. 1 and 2 illustrate a non-skid pad 116 disposed on the work surface 24 to enhance the stability of the computer 30 on the surface. When the computer is not in use or, especially, when the vehicle is in motion, a strap 118 secures the computer to the shelf 52. The strap may attach to itself with well known structures such as hook and loop fasteners (e.g., Velcro).

Figure 8:
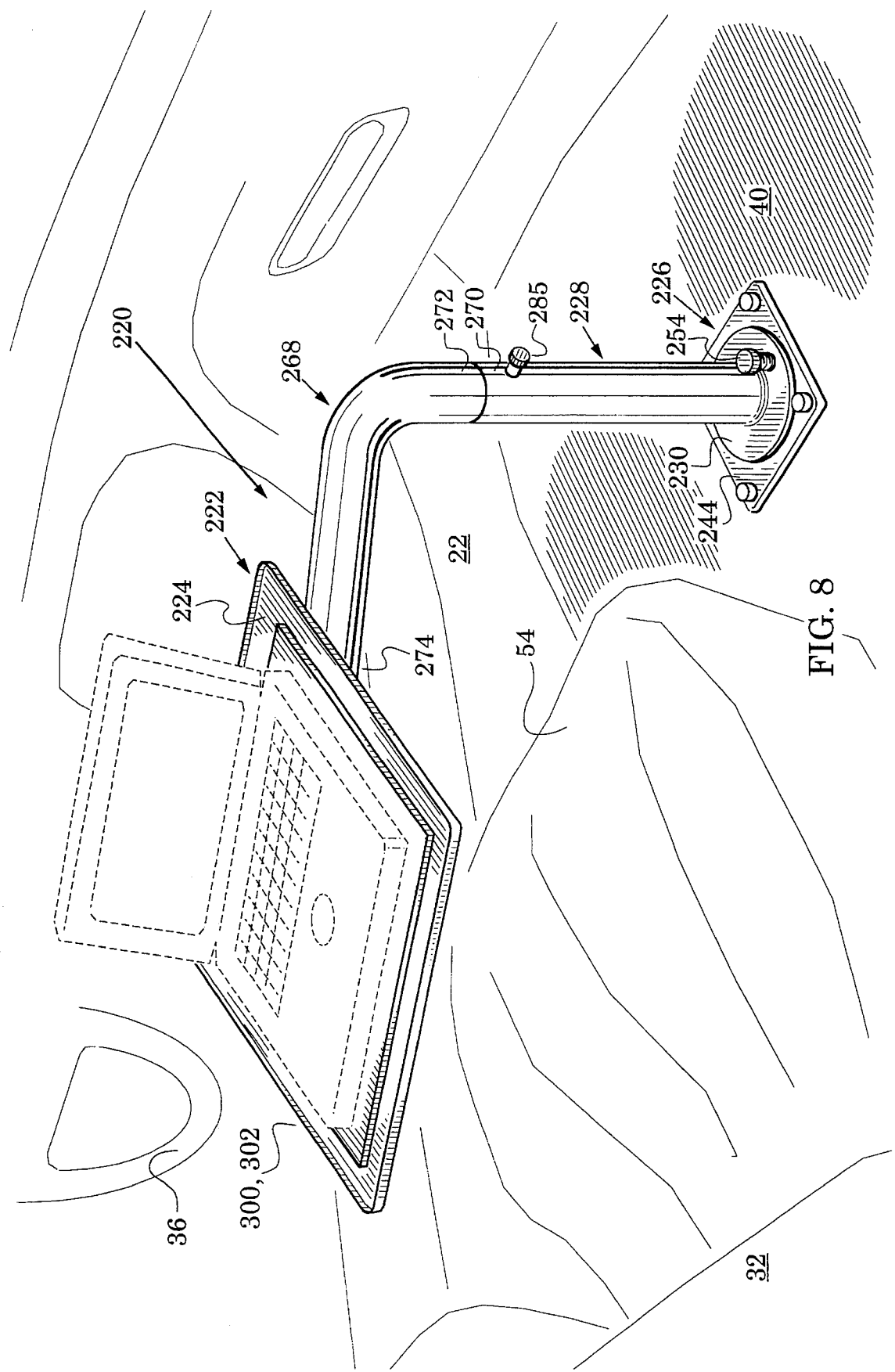
FIG. 8 is a perspective view of another preferred desk embodiment installed in a vehicle interior.

FIG. 8 is a view similar to FIG. 1 and illustrates another preferred vehicle desk embodiment 220 installed in a vehicle interior 22. The desk 220 includes a shelf 222 which presents a work surface 224 similar to the vehicle desk 20 of FIG. 1. However, as shown in the similar view of FIG. 9, the embodiment 220 leaves a lower profile base 226 on the vehicle floor pan 40 when the upper portion of the desk 220 is removed.

As shown in FIG. 8, an upward extending support member 228 rises from an integral annular collar 230. The support member 228 is attached to the base 226 that, in turn, attaches to a portion of the vehicle, preferably the floor pan 40. FIG. 10 illustrates details of the support member 228, collar 230 and base 226. The lower surface 234 of the collar 230 and support member 226 is relieved to define an annular groove 240. The inner wall of the annular groove 240 defines conventional male threads 242.

The base 226 includes a flange 244 configured with a surface 245 which is configured to abut a vehicle surface such as the floor pan 40. The flange 244 is thereattached with conventional fasteners 246, e.g., carriage bolts, sheet metal screws. A pedestal 247 rises from the flange 244 and its upper surface is relieved to define an annular rim 248. The inner surface of the annular rim 248 defines female threads 250.

In use, the base 226 is first arranged with its lower surface 245 abutting the floor pan 40 after which fasteners 246 attach the flange 244 and floor pan 40 together. The support member 228 is then positioned to receive the annular rim 248 in the annular groove 240. The support member 228 moves downward to bring the lower collar surface 234 into contact with the upper surface 252 of the base flange 244 and to bring the inner and outer surfaces of the rim 248 into contact with the inner and outer surfaces of the groove 240. Contact between the surfaces 234 and 252 and between the inner and outer surfaces of the rim 248 and groove 240 provides leverage to resist forces that would tend to move the support member 228 laterally. The threads 242 and 250 engage to firmly urge these surfaces together as the support member 228 is turned relative to the base 226.

The pointed end of a set screw 254 is received into a dimple 256 in the base flange 244 to resist turning of the support member 228 that would tend to disengage the threads and the above mentioned surfaces. The threads 242, 250 pull the surfaces of the support member 228 and base 228 together so firmly that it is sometimes difficult to begin disengagement of the threads. A washer 258 of a low frictional material, e.g., teflon, may be placed between the surfaces 234, 252 to facilitate starting disengagement of the threads 242, 250.

As seen in FIG. 8. an outward extending support member or arm 268 generally defines an L shape so as to rotatably engage the upper end 270 of the upward extending support member 228 with a lower end 272 while extending an opposite end 274 outward to support the work surface 224. Details of the rotatable engagement between the ends 270 and 272 is shown in FIG. 11 where the lower end 272 is seen to define a downward extending pin 276. The pin 276 is rotatably received in a socket 278 in the upper end 270. The support member 228 may be formed of a hollow metal tube to automatically define the socket 278.

A spring loaded detent 280 is mounted in the upper end 270 and has a pin 282 that is received in a selected one of a plurality of depressions or holes 284 in the pin 276. In this way, the outward extending member 268 can be locked in a plurality of predetermined angular positions relative to the support member 228. To allow the member 268 to be locked in other angular positions intermediate to the predetermined ones, a set screw 285 is mounted in the upper end 270 to threadably engage a wall of the socket 278 so as to be urged inward to abut the pin 276. In use, the pin 276 is rotatably received in the socket 278 so that the annular rim 286 of the lower end 272 abuts the annular rim 288 of the upper end 270.

The outer end 274 of the support member 268 rotatably holds the shelf 222. Details of this rotatable engagement are shown in FIGS. 12A and 12B where FIG. 12B is a side view of the structure of FIG. 12A. The outer end 274 is seen to terminate in a vertically oriented tube 290 that defines an internal socket 292. A pin 294 extends downward from the shelf 222 and is rotatably received in the socket 292. A spring loaded detent 295 and a set screw 296 are carried in the tube 290. The detent 295 locks into a plurality of depressions or holes 298 in the pin 294 to set predetermined angular positions of the shelf. The inner end of the set screw 296 can be urged inward against the pin 294 to set intermediate angular positions.

As seen in FIG. 12A and in FIG. 8, the shelf 222 defines an upward extending rim 300 to resist loss of objects placed on the work surface 224. This rim 300 is rounded at its corners and carries a resilient, e.g., rubber, bead 302 to reduce damage to the vehicle interior as the work surface is swung to various angular positions.

In operation, the base 226 is installed onto a vehicle structure such as the floor pan 40 as shown in FIG. 9. The base 226 defines a low profile having only the upward extending pedestal 247 to obstruct normal use of the vehicle when the desk 222 is not in use. When the desk 220 is needed, the support member 228 is rotated onto the base 226 to engage the collar 230 and the flange 244 and the inner and outer surfaces of the rim 248 and groove 240 as shown in FIG. 10 and described above. These contacting surfaces provide the leverage to rigidly support the support member 228 against lateral forces. The set screw 254 is then engaged with the dimple 256 in the flange 244 (as shown in FIG. 10) to resist rotational disengagement of the support member 228 from the base 226.

Next, the shelf 222 and rotatably attached support member 268 are lowered to rotatably receive the pin 276 into the upper end 270 of the support member 228 as shown in FIG. 11. The support member 268 can now be rotated on the support member 228 to position the work surface 224 as desired. The selected position of the support member 268 is locked with the detent 280 or set screw 285 as shown in FIG. 11. The angular orientation of the shelf 222 can be selected by rotating it in the outer end 274 of the support member 268 as shown in FIG. 12A. The selected angular position is then locked with the detent 295 or set screw 296.

It should be understood that embodiments equivalent to the desk 220 may be devised by interchanging elements described above. For example, the rim 248 and its receiving groove 240 may be interchanged between the base 226 and the support member 228. In similar fashion, the pins and receiving sockets may be interchanged with elements of the interface between the support member 228 and support member 268 and the interface between the support member 268 and the shelf 222.

From the foregoing it should now be recognized that a vehicle desk embodiment has been disclosed herein configured to position a work surface in a vertically spaced relationship with the lower portion of the vehicle driver and passenger seats. Support apparatus in accordance with the invention are generally horizontally spaced from the vehicle front passenger seat. The major portion of such apparatus are easily removable from the vehicle to leave only a low profile base structure in the vehicle interior. Embodiments of the invention include locking structures to prevent movement of the desk when the vehicle is in motion. Embodiments of the invention are particularly useful in vehicles employed in visits to multiple locations, e.g., in sales and deliveries.

The preferred embodiments of the invention described herein are exemplary and numerous modifications, dimensional variations and rearrangements can be readily envisioned to achieve an equivalent result, all of which are intended to be embraced within the scope of the appended claims.

What is claimed is:

1. A vehicle desk, comprising:

a base configured for securement thereof to a vehicle floor;

a first support member having upper and lower ends;

a second support member having inner and outer ends;

a shelf defining a work surface;

an annular rim having inner and outer surfaces, said rim defined by one of said base and said first support member lower end;

an annular groove having inner and outer surfaces, said groove defined by the other of said base and said first support member lower end;

said rim supportingly received in said groove;

said inner and outer surfaces of said rim firmly contacting said inner and outer surfaces of said groove to support said first support member against lateral forces thereon, and to resist rotational disengagement of said first support member from said base;

a first socket defined by one of said first support member upper end and said second support member inner end;

a first pin defined by the other said first support member upper end and said second support member inner end;

said first pin rotatably and selectively lockably received in said first socket;

a second socket defined by one of said second support outer end and said shelf;

a second pin defined by the other said second support member outer end and shelf; and, said second pin rotatably received in said second socket.

2. The desk of claim 1 further including:

a collar defined by said first support member lower end;

a surface defined by said base; and said first support member and said base configured to abut said surface with said collar when said rim is received in said groove to further support said first support member against lateral forces thereon.

3. The desk of claim 1 further including:

first threads defined by said rim; and second threads defined by said groove to threadably engage said first threads for forcibly pulling said rim within said groove.

* * * * *